Patented Feb. 25, 1936

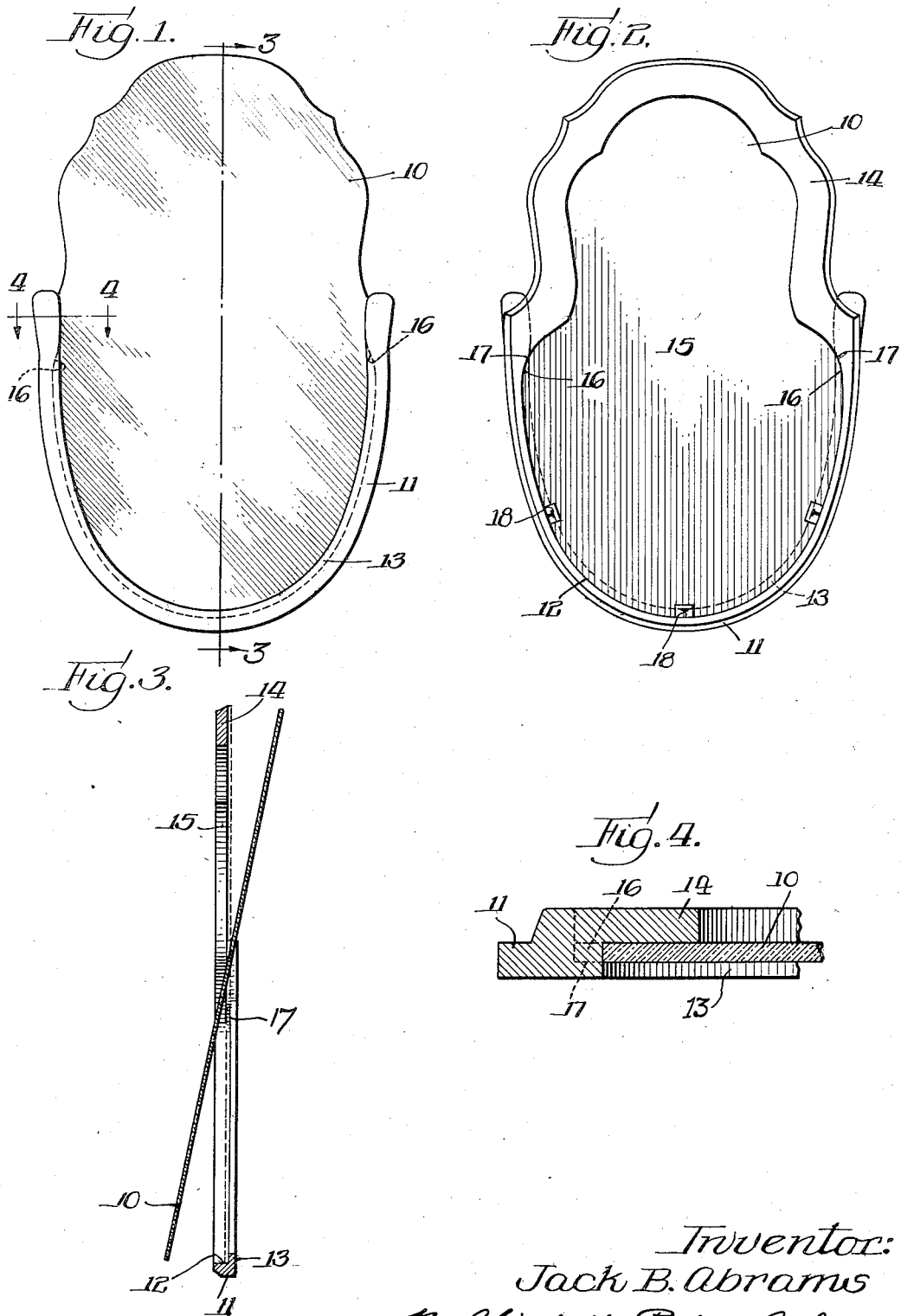

2,031,627

UNITED STATES PATENT OFFICE 2,031,627

FRAMED MIRROR

Jack B. Abrams, Chicago, Ill.

Application February 3, 1934, Serial No. 709,580

8 Claims. (Cl. 88—96)

The present invention relates to improvements in framed mirrors, and has particular reference to a new and improved mirror of the semi-Venetian type.

In a mirror of the semi-Venetian type, the glass or mirror panel is mounted in position against a backing member which is unexposed at the front. A frame attached to the backing member extends about a portion, usually the lower half, of the periphery of the glass. The remaining portion of the peripheral margin of the glass, usually the upper half, since it is not enclosed within a frame, can be provided in various ornamental shapes with sharp beveled corners. Hence, mirrors of this type have become very popular because they combine the beauty of the glass with the desirable features of a partial frame.

As heretofore constructed, the frame does not overlap the glass, and hence the entire peripheral edge of the latter is exposed and must be finished. The backing member consists of a solid board which is of the same general configuration as the glass, but slightly smaller, and to which the glass is directly secured by suitable fastening means. In some instances, spaced overlapping brackets or ornaments are utilized to secure the glass in place. However, usually bolts are inserted through holes in the glass, and threaded into the backing member. Both forms of fastening means impair the beauty of the glass, and detract from the general appearance of the mirror. The glass also frequently breaks at the holes.

The primary object of the present invention is to provide a novel mirror embodying all of the desirable features of the semi-Venetian type mirror, but avoiding the use of fastening means of the foregoing character and the disadvantages inherent therein.

Another object resides in the provision of a new and improved one-piece supporting structure comprising a frame adapted to overlap a portion of the peripheral margin of the glass, and an open-work backing member adapted to permit ready insertion of the glass into position against the frame, and then to afford an underlying support for the glass.

A further object resides in the provision of new and improved means, avoiding the use of exposed ornaments overlapping the unframed portion of the glass or of bolts extending through holes in the glass, for retaining the glass securely in position.

Other objects and advantages will become apparent as the description proceeds.

In the accompanying drawing, Figure 1 is a front view of a mirror embodying the features of my invention.

Fig. 2 is a rear elevational view of the one-piece supporting structure for the glass.

Fig. 3 is a fragmentary vertical sectional view taken substantially along line 3—3 of Fig. 1, but illustrating the glass tilted at an angle as in the assembly operation.

Fig. 4 is a fragmentary detailed sectional view taken along line 4—4 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the mirror constituting the exemplary embodiment of the invention comprises a glass or mirror panel 10 which may be provided in any desired size, shape and configuration. A frame 11 conforms closely in shape to, and encloses a portion of the periphery of the glass 10, preferably the lower half. In the present instance, the frame 11 is formed in its rear inner edge throughout its length with a notch or rabbet 12 adapted to receive the lower end portion of the glass 10, and defining a marginal flange 13 overlying and concealing the peripheral edge of the framed portion of the glass. Since this peripheral edge is covered, it can be left unfinished, thereby effecting a considerable saving in expense.

Extending upwardly from the frame 11 is an open-work backing member 14 adapted to support the upper unframed portion of the glass 10. The backing member 14 preferably consists of a wooden strip having the same configuration as the peripheral margin of the overlying glass 10 but spaced slightly inwardly therefrom. The frame member 14 is located in an offset plane parallel to and spaced rearwardly from the plane of the flange 13 a distance substantially equal to the thickness of the glass 10. When the glass 10 is in position, the lower portion engages the inner face of the flange 13, and the upper portion rests against the frame member 14.

The frame 11 and the backing member 14 are rigidly connected, and preferably constitute a non-separable single piece supporting structure. They define an opening 15 adapted to receive the glass 10 in the assembly operation. In the present instance, the portion of the opening 15 defined by the backing member 14 is narrower than that within the confines of the frame 11. Similarly, the upper end portion of the glass 10 is narrower than the lower portion, but it is to be understood that the invention is not necessarily limited to this general shape.

The glass 10 and the supporting structure are formed with interfitting means adapted to lock the glass against endwise withdrawal from the flange 13. This means may be provided in various forms. Preferably, it consists of two upwardly facing shoulders 16 formed respectively in opposite sides of the glass 10, and adapted to engage against opposed stops 17 adjacent the upper ends of the frame 11. In the present instance, these stops consist of downwardly facing shoulders defined by the upper ends of the rabbet 12, and complementary in shape to the coacting shoulders 16. It will be evident that the coacting shoulders 16 and 17 at either side of the frame 11 are adequate to hold the glass 10 against endwise movement.

In assembling the mirror, the relatively small upper end of the glass 10 is inserted through the opening 15 between the sides of the frame 11 from the rear until the shoulders 16 engage the shoulders 17. Then, the glass 10 is tilted about the shoulders 16 and 17, which act as a pivot, into position against the flange 13 and the backing member 14 as indicated in Fig. 3. The glass 10 is then firmly secured in position by the simple expedient of forcing a series of nails 18 at spaced points into the frame 11 back of the glass.

It will be evident that I have provided a new and improved mirror of the semi-Venetian type in which the glass 10 is held securely in position without necessitating the provision of holes through the glass, or the use of exposed fastening means across any front portion of the unframed margin. The construction is sturdy and inexpensive, and the parts may be easily and quickly assembled. The beauty of the glass is fully retained.

By the word "glass" as used herein, is meant the usual looking glass with the silvered back as well as any equivalent member having a reflecting surface.

It will be evident that the supporting structure, consisting of the frame and the backing member, per se, embodies features which may adapt it for use with other articles that are frequently framed, such, for example, as pictures, paintings and signs. The invention is therefore not limited necessarily to the use of the supporting structure for mirrors.

I claim as my invention:

1. A mirror of the semi-Venetian type comprising, in combination, a vertically elongated glass formed in opposite sides intermediate its ends respectively with two upwardly facing shoulders, a one-piece supporting structure having a frame formed with a rabbet in its rear side receiving the peripheral margin of the lower end portion of said glass and having an open work backing member rigid with said frame and underlying the upper end portion of said glass, the ends of said rabbet defining downwardly facing shoulders engaging said first mentioned shoulders to prevent endwise withdrawal of said glass from said frame, and means attached to said frame for engaging the rear of said glass to hold the latter in said rabbet.

2. A mirror comprising, in combination, a vertically elongated glass formed in opposite sides respectively with upwardly facing shoulders, a frame conforming to the shape of the lower end portion of said glass and formed in its rear inner edge with a longitudinal rabbet defining a marginal flange, the peripheral margin of said glass engaging in said rabbet against said flange, the upper ends of said rabbet being formed with downwardly facing shoulders in engagement with said first mentioned shoulders to prevent endwise movement of said glass out of said rabbet, a backing member rigid with said frame and underlying the upper end portion of said glass, said glass being adapted for pivotal movement about said shoulders away from said flange, and then for endwise withdrawal from said frame, and removable means for normally securing said glass against pivotal movement from said flange.

3. A mirror comprising, in combination, a glass formed in one side with a shoulder, a frame conforming to the shape of one end portion of said glass and formed in its rear inner edge with a longitudinal rabbet defining a marginal flange, the peripheral margin of said glass engaging in said rabbet against said flange, one end of said rabbet being formed with a shoulder in engagement with said first mentioned shoulder to prevent endwise movement of said glass out of said rabbet, a backing member rigid with said frame and underlying the other end portion of said glass, said glass being adapted for pivotal movement about said shoulders away from said flange and then for endwise withdrawal from said frame, and means for normally securing said glass against pivotal movement from said flange.

4. A mirror comprising, in combination, a supporting structure formed with a central opening and having a frame and a backing member, said structure defining a stop, a mirror panel covering said opening, the front of said panel engaging said frame and the rear of said panel engaging said backing member, said panel having means cooperating with said stop to prevent linear withdrawal of said panel from said supporting structure, and means for securing said panel against said frame.

5. A mirror comprising, in combination, a supporting structure formed with a central opening and having a frame and a backing member, means in said structure defining a stop, a mirror panel formed with a shoulder in engagement with said stop, and mounted in engagement at the front with said frame and at the rear with said backing member, said stop limiting linear withdrawal of said panel from said supporting structure, said panel being adapted for pivotal movement about said stop out of engagement with said frame and then for endwise movement out of said opening, and means for normally securing said panel pivotally against said frame.

6. A mirror comprising, in combination, a mirror panel, a one-piece supporting structure for said panel having a frame enclosing a portion of the perimeter of said panel and a backing member located against the rear of said panel, the remaining portion of said panel being unconfined, and means including interlocking surfaces on said supporting structure and said panel for securing the latter against removal from said frame.

7. A supporting structure for an article to be framed comprising, in combination, a frame adapted to partially enclose the article, a backing member adapted to be located against the rear of the article, said structure being formed with a shoulder adapted to coact with a shoulder on the article to lock the latter against movement therefrom in a plane parallel to said frame, and means adapted to secure the article against angular movement away from said frame.

8. A mirror of the semi-Venetian type comprising, in combination, an open work supporting structure having a central opening and having a front frame and a rigid backing member, a flat mirror panel covering said opening, said panel at the front engaging said frame and being confined thereby over a portion of its perimeter and at the rear wholly overlying and engaging said backing member and being substantially unconfined thereby at the perimeter, means in said structure defining a stop, means on said panel interfitting with said stop and coacting therewith to prevent removal of said panel from said frame by linear movement in a plane generally parallel to said frame, and means for holding said panel against said frame.

JACK B. ABRAMS.